(12) United States Patent
Bialer et al.

(10) Patent No.: US 11,796,671 B2
(45) Date of Patent: Oct. 24, 2023

(54) TRANSMISSION SCHEME FOR IMPLEMENTING CODE DIVISION MULTIPLE ACCESS IN A RADAR SYSTEM

(71) Applicant: GM Global Technology Operations LLC, Detroit, MI (US)

(72) Inventors: Oded Bialer, Petah Tivak (IL); Amnon Jonas, Herzliya (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 324 days.

(21) Appl. No.: 17/194,892

(22) Filed: Mar. 8, 2021

(65) Prior Publication Data
US 2022/0283299 A1    Sep. 8, 2022

(51) Int. Cl.
G01S 13/931    (2020.01)
G01S 7/40    (2006.01)

(52) U.S. Cl.
CPC .......... *G01S 13/931* (2013.01); *G01S 7/4056* (2013.01); *G01S 2013/93271* (2020.01)

(58) Field of Classification Search
CPC ................. G01S 13/931; G01S 7/4056; G01S 2013/93271
See application file for complete search history.

(56) References Cited

U.S. PATENT DOCUMENTS

| | | | |
|---|---|---|---|
| 11,054,516 B2* | 7/2021 | Wu | G01S 7/354 |
| 2013/0176166 A1* | 7/2013 | Kishigami | G01S 7/0234 |
| | | | 342/202 |
| 2017/0212213 A1* | 7/2017 | Kishigami | G01S 13/284 |
| 2019/0250249 A1* | 8/2019 | Raphaeli | G01S 13/582 |
| 2020/0011983 A1* | 1/2020 | Kageme | G01S 13/325 |
| 2020/0150256 A1* | 5/2020 | Dent | G01S 13/106 |
| 2020/0191939 A1* | 6/2020 | Wu | G01S 7/354 |
| 2021/0067440 A1* | 3/2021 | Rodinger | H04L 67/12 |
| 2021/0236815 A1* | 8/2021 | Waldstreicher | A61N 1/32 |
| 2021/0393327 A1* | 12/2021 | Eyster | A61B 18/1492 |
| 2022/0155428 A1* | 5/2022 | Koyama | G01S 7/536 |
| 2022/0221553 A1* | 7/2022 | Gulati | G01S 7/0235 |
| 2022/0385199 A1* | 12/2022 | Xu | H02M 3/33571 |

* cited by examiner

*Primary Examiner* — Marcus E Windrich
(74) *Attorney, Agent, or Firm* — CANTOR COLBURN LLP

(57) ABSTRACT

A vehicle includes a plurality of transmitters of a code division multiple access (CDMA) radar system to simultaneously transmit a frame of transmit signals. A first time duration between transmissions of a first pair of sequential ones of the transmit signals is linearly increased to a second time duration between transmissions of a second pair of sequential ones of the transmit signals. The vehicle also includes a receiver of the CDMA radar system to receive reflected energy resulting from reflection of one of more of the transmit signals of one or more of the plurality of transmitters by an object. A controller processes the reflected energy to obtain information about the object and to control an operation of the vehicle based on the information.

20 Claims, 5 Drawing Sheets

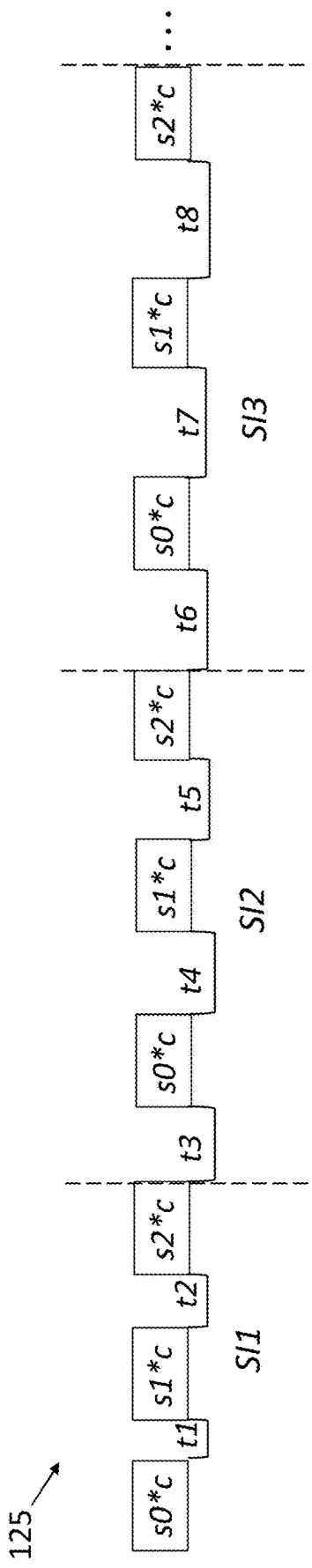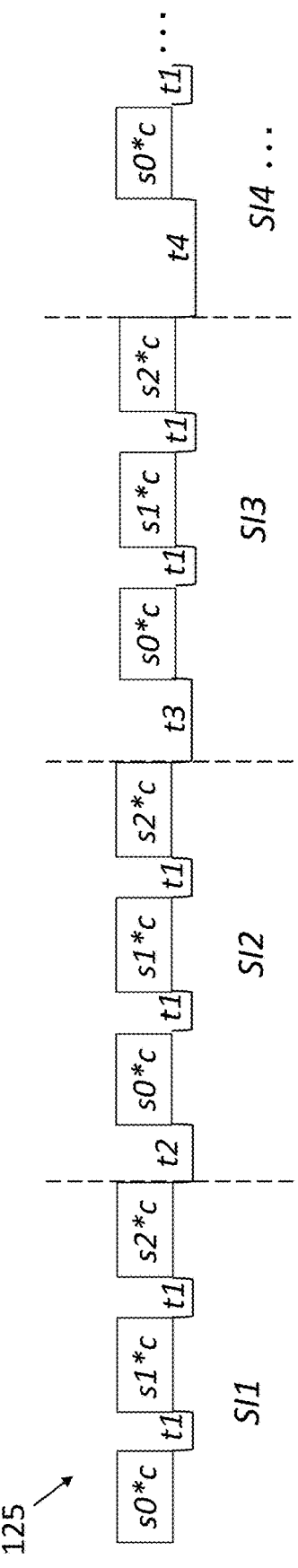
FIG. 3A
FIG. 3B

TRANSMISSION SCHEME FOR IMPLEMENTING CODE DIVISION MULTIPLE ACCESS IN A RADAR SYSTEM

INTRODUCTION

The subject disclosure relates to a transmission scheme for implementing code division multiple access in a radar system.

Vehicles (e.g., automobiles, trucks, constructions equipment, farm equipment, automated factory equipment) increasingly use sensors to obtain information about the vehicle and its surroundings. The information may be used to control one or more aspects of vehicle operation. Exemplary sensors that obtain information about the environment outside the vehicle include cameras, light detection and ranging (lidar) systems, and radio detection and ranging (radar) systems. In a multiple-input multiple-output (MIMO) radar system that facilitates simultaneous transmission from multiple transmit elements, code division multiple access (CDMA) is one method for separating resulting reflections. Accordingly, it is desirable to provide a transmission scheme for implementing CDMA in a radar system.

SUMMARY

In one exemplary embodiment, a vehicle includes a plurality of transmitters of a code division multiple access (CDMA) radar system to simultaneously transmit a frame of transmit signals. A first time duration between transmissions of a first pair of sequential ones of the transmit signals is linearly increased to a second time duration between transmissions of a second pair of sequential ones of the transmit signals. The vehicle also includes a receiver of the CDMA radar system to receive reflected energy resulting from reflection of one of more of the transmit signals of one or more of the plurality of transmitters by an object. A controller processes the reflected energy to obtain information about the object and to control an operation of the vehicle based on the information.

In addition to one or more of the features described herein, the frame of the transmit signals transmitted by each of the plurality of transmitters is based on a same chirp, which is a frequency modulated continuous wave (FMCW) signal.

In addition to one or more of the features described herein, the frame of the transmit signals transmitted by each of the plurality of transmitters includes M transmit signals repeated over sequence intervals that make up the frame, and M is greater than or equal to a number of the plurality of transmitters.

In addition to one or more of the features described herein, the M transmit signals for each of the plurality of transmitters result from multiplying the chirp with M symbols, and the M symbols are different for each of the plurality of transmitters.

In addition to one or more of the features described herein, the M symbols are a Hadamard code sequence or a pseudorandom sequence.

In addition to one or more of the features described herein, the first pair of sequential ones of the transmit signals is a last transmit signal of a first sequence interval among the sequence intervals that make up the frame and a first transmit signal of a second sequence interval among the sequence intervals, and the second pair of sequential ones of the transmit signals is a last transmit signal of the second sequence interval and a first transmit signal of a third sequence interval among the sequence intervals.

In addition to one or more of the features described herein, a time duration between transmission of sequential ones of the transmit signals within a same sequence interval among the sequence intervals is a constant time duration for all the sequence intervals.

In addition to one or more of the features described herein, the first pair of sequential ones of the transmit signals and the second pair of sequential ones of the transmit signals are within a same sequence interval among the sequence intervals that make up the frame.

In addition to one or more of the features described herein, processing the reflected energy includes obtaining a vector of elements from the reflected energy and decoding every M elements of the vector together based on a repetition of the M transmit signals for each of the sequence intervals.

In addition to one or more of the features described herein, the vehicle also includes one or more additional receivers of the CDMA radar system.

In another exemplary embodiment, a method of configuring a radar system in a vehicle includes arranging a plurality of transmitters of a code division multiple access (CDMA) radar system to simultaneously transmit a frame of transmit signals. A first time duration between transmissions of a first pair of sequential ones of the transmit signals is linearly increased to a second time duration between transmissions of a second pair of sequential ones of the transmit signals. The method also includes arranging a receiver of the CDMA radar system to receive reflected energy resulting from reflection of one of more of the transmit signals of one or more of the plurality of transmitters by an object. A controller processes the reflected energy to obtain information about the object and to control an operation of the vehicle based on the information.

In addition to one or more of the features described herein, the method also includes basing the frame of the transmit signals transmitted by each of the plurality of transmitters on a same chirp, which is a frequency modulated continuous wave (FMCW) signal.

In addition to one or more of the features described herein, the method also includes including, in the frame of the transmit signals transmitted by each of the plurality of transmitters, M transmit signals repeated over sequence intervals that make up the frame, wherein M is greater than or equal to a number of the plurality of transmitters.

In addition to one or more of the features described herein, the method also includes obtaining the M transmit signals for each of the plurality of transmitters by multiplying the chirp with M symbols, wherein the M symbols are different for each of the plurality of transmitters.

In addition to one or more of the features described herein, the method also includes selecting the M symbols to be a Hadamard code sequence or a pseudorandom sequence.

In addition to one or more of the features described herein, the first pair of sequential ones of the transmit signals is a last transmit signal of a first sequence interval among the sequence intervals that make up the frame and a first transmit signal of a second sequence interval among the sequence intervals, and the second pair of sequential ones of the transmit signals is a last transmit signal of the second sequence interval and a first transmit signal of a third sequence interval among the sequence intervals.

In addition to one or more of the features described herein, the method also includes configuring a time duration between transmission of sequential ones of the transmit signals within a same sequence interval among the sequence intervals as a constant time duration for all the sequence intervals.

In addition to one or more of the features described herein, the method also includes configuring the first pair of sequential ones of the transmit signals and the second pair of sequential ones of the transmit signals to be within a same sequence interval among the sequence intervals that make up the frame.

In addition to one or more of the features described herein, the method also includes processing the reflected energy includes obtaining a vector of elements from the reflected energy and decoding every M elements of the vector together based on a repetition of the M transmit signals for each of the sequence intervals.

In addition to one or more of the features described herein, the method also includes arranging an additional one or more receivers of the CDMA radar system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3A illustrates an exemplary transmit signal according to one or more embodiments;

FIG. 3B illustrates another exemplary transmit signal according to one or more embodiments;

DETAILED DESCRIPTION

Figure 1:
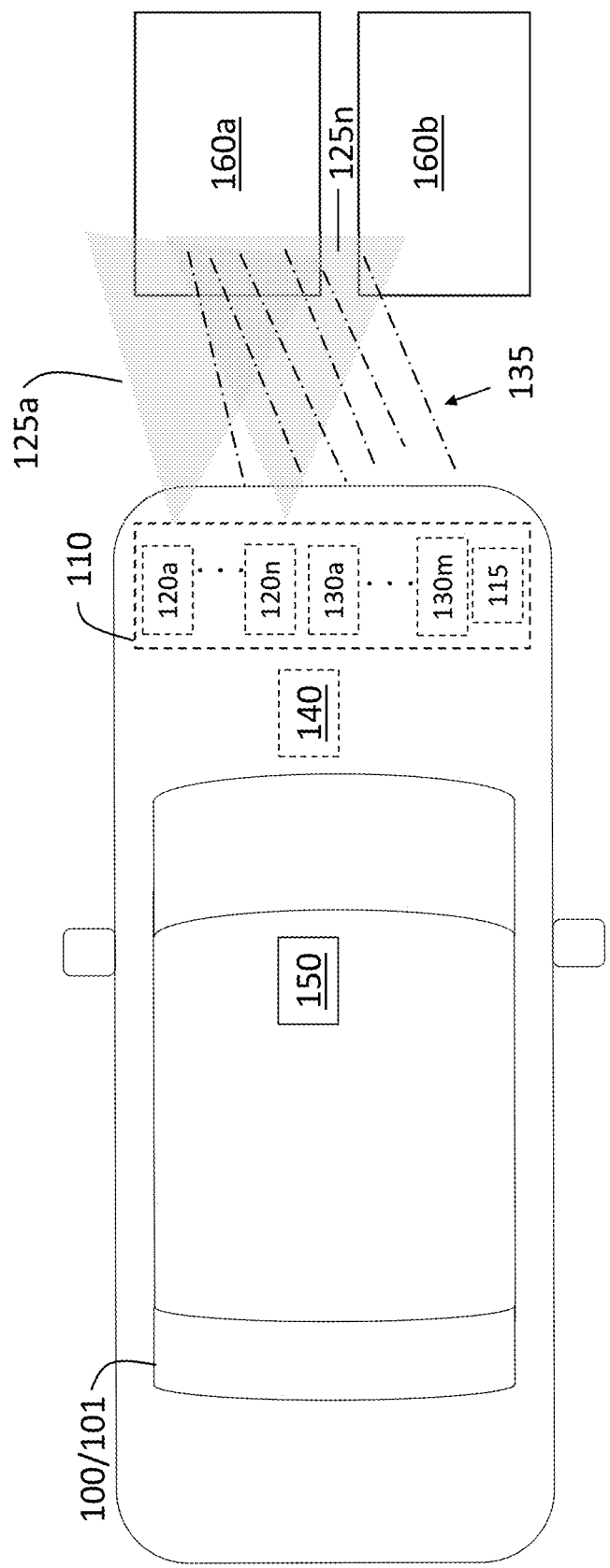
FIG. 1 is a block diagram of a vehicle that employs a transmission scheme using code division multiple access (CDMA) in a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system and, more specifically, a MIMO radar system is one of the sensors that may be used to obtain information about objects around a vehicle. A MIMO radar system includes multiple transmit elements and multiple receive elements. Simultaneous transmission from the multiple transmit elements increases the total energy that is emitted at one time and thereby increases the maximum detection range. When the simultaneously transmitted signals from multiple transmit elements encounter one or more objects, reflections of the various transmitted signals are received at the radar system as a sum of all the reflected energy. The reflections must be separated according to the transmit element to which they correspond for angular resolution. That is, each portion of the received signal must be processed based on the transmitted signal that gave rise to it in order to obtain an accurate estimation of the angle to the object (i.e., direction of arrival (DOA) of the reflection).

CDMA refers to each transmit element transmitting a differently coded signal such that the portion of the received signal corresponding with each of the transmit elements may be identified based on the coding. According to a prior transmission scheme, each transmit element repeats a different code sequence within a frame of transmissions. According to another prior transmission scheme, each transmit element transmits a different long pseudo random code. However, each of these prior schemes suffers from disadvantages in the vehicle application, which involves a frequency shift (i.e., a Doppler frequency) in the received signal as compared with the transmitted signals. This frequency shift is due to the relative movement of the vehicle and the object (e.g., another vehicle) generating the received signal and is used to determine range rate, referred to as Doppler, of the object.

Embodiments of the systems and methods detailed herein relate to a transmission scheme for implementing CDMA in a radar system. Objects (e.g., other vehicles) travelling at similar velocities, but which are at different ranges from the radar system, are discernable based on their ranges. Similarly, objects at a similar range, but which are travelling at different velocities, will soon exhibit a difference in range that will facilitate discrimination between the two objects. The scenario that is problematic for the above-mentioned prior schemes involves two objects that are similar in range to the radar system and are also travelling at similar velocities. In this case, the reflections from the objects will mask each other for the duration that the objects remain at similar ranges. The linear delay introduced by the transmission scheme according to one or more embodiments, as detailed herein, facilitates detection of each of the objects travelling at a similar range with a similar velocity.

In accordance with an exemplary embodiment, FIG. 1 is a block diagram of a vehicle 100 that employs a transmission scheme using CDMA in a radar system 110. The exemplary vehicle 100 shown in FIG. 1 is an automobile 101. The vehicle 100 includes a radar system 110 with transmitters 120a through 120n (generally referred to as 120) and receivers 130a through 130m (generally referred to as 130). The number of transmitters 120 and the number of receivers 130 may or may not be the same (i.e., n may or may not be equal to m). The transmitters 120a through 120n transmit corresponding transmit signals 125a through 125n (generally referred to as 125). As further discussed, each transmit signal 125 is coded differently. The simultaneous transmission of coded transmit signals 125 from each of the transmitters 120 may encounter one or more objects 160. Exemplary objects 160a, 160b (e.g., other vehicles) are shown in FIG. 1. Portions of the transmit signals 125 that encounter the objects 160 result in reflected energy 135 that is reflected back to the radar system 110 and is received by one or more of the receivers 130. The radar system 110 also includes a controller 115 that controls the transmission scheme that is implemented by the transmitters 120 and may process the reflected energy 135 received by the receivers 130.

The vehicle 100 also includes a controller 140 that obtains information from the radar system 110 and one or more other sensors 150 to control an operation of the vehicle 100. Exemplary operations include collision avoidance, automated braking, and adaptive cruise control. Other sensors 150 include cameras and a lidar system, for example. The numbers and locations of the radar system 110 and other sensors 150 are not intended to be limited by the illustration in FIG. 1. The controller 115 of the radar system and the controller 140 of the vehicle 100 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
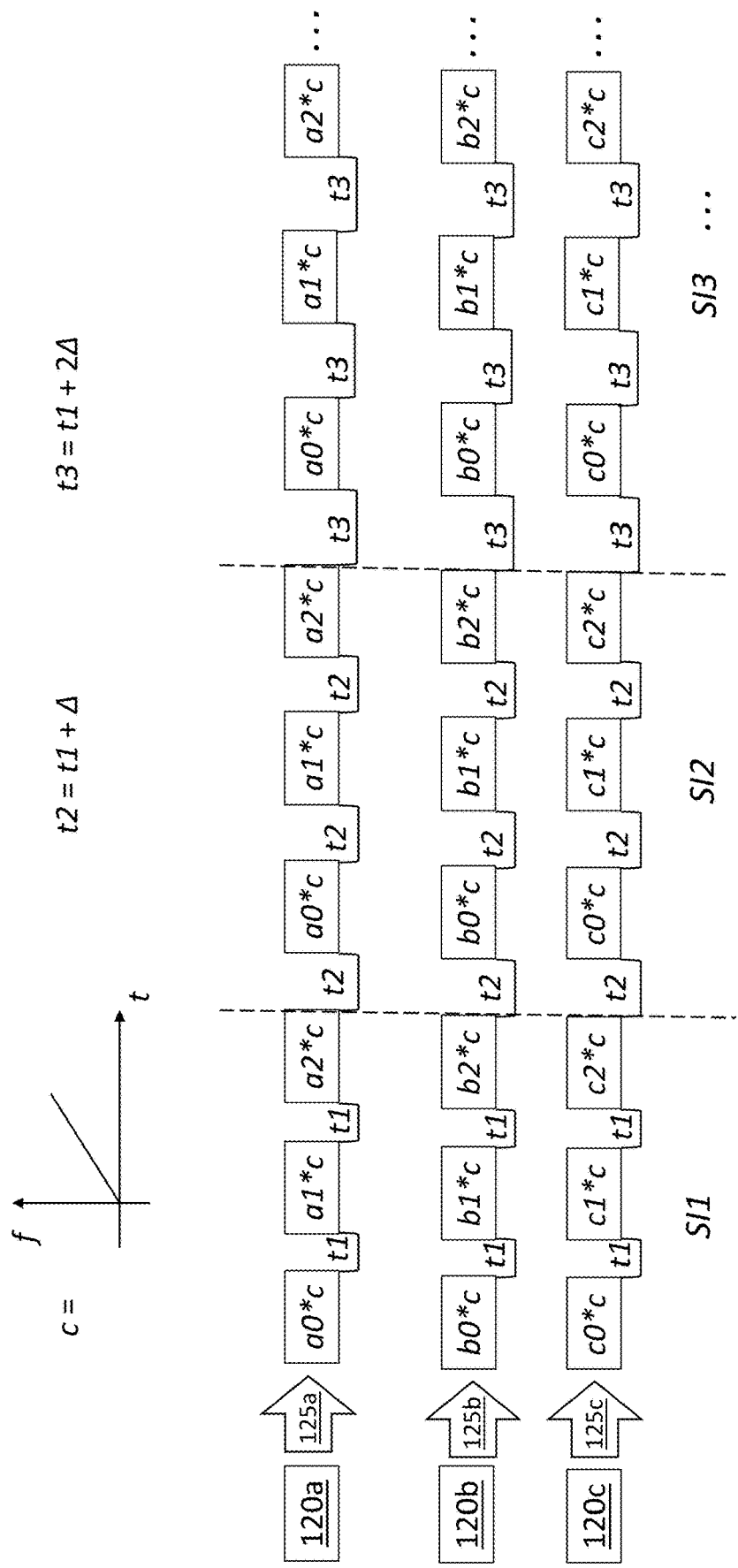
FIG. 2 illustrates an exemplary transmission scheme for implementing CDMA according to one or more embodiments.

FIGS. 2, 3A, and 3B illustrate the transmission scheme for employing CDMA in a radar system 110 according to different exemplary embodiments. FIG. 2 illustrates an exemplary transmission scheme for implementing CDMA according to one or more embodiments. Three transmitters 120a, 120b, 120c transmitting three transmit signals 125a, 125b, 125c are assumed in the illustration for explanatory purposes. A foundation of each transmit signal 125 is the linear frequency modulated continuous wave (LFMCW) signal or chirp c shown in FIG. 2. An exemplary chirp c is shown with time t and frequency f on perpendicular axes. As indicated, the frequency increases linearly with time. Alternately, a chirp c may exhibit a linear decrease in frequency.

A repeating sequence of symbols, {a0, a1, a2}, {b0, b1, b2}, or {c0, c1, c2}, respectively multiplies the chirp c at each transmitter 120. The sequence of symbols that repeats may be referred to as a primal sequence. Thus, in the exemplary case, {a0, a1, a2} is the primal sequence for transmitter 120a, {b0, b1, b2} is the primal sequence for transmitter 120b, and {c0, c1, c2} is the primal sequence for transmitter 120c. The number of symbols in the primal sequence is at least the same as the number of transmitters 120 or more. In the exemplary case of three transmitters 120, a minimum of three symbols must be in the primal sequence, as shown.

Each sequence interval SIi, where i is the index of the interval, includes a sequence of chirp multiples. Each chirp multiple is obtained by multiplying one of the symbols of the primal sequence with the chirp c. For example, to generate a frame of the transmit signal 125a, the primal sequence of symbols {a0, a1, a2} multiplies the chirp c in a repeating pattern such that transmission of chirp multiples a0*c, a1*c, a2*c is repeated in sequence intervals SI1, SI2, and SI3, as shown. As another example, the sequence of chip multiples for transmit signal 125c is c0*c, c1*c, c2*c and is shown repeated for sequence intervals SI1, SI2, SI3. The frame may include any number of sequence intervals SIi.

According to the exemplary embodiment shown in FIG. 2, the time duration between chirp multiples within a sequence interval SIi is constant but the time duration from one sequence interval SIi to the next sequence interval SI(i+1) increases linearly. That is, the time duration t1 between chirp multiples {a0*c, a1*c, a2*c}, {b0*c, b1*c, b2*c}, or {c0*c, c1*c, c2*c} within the first sequence interval SI1 increases linearly to a time duration t2 between the chirp multiples within the second sequence interval SI2 and to a time duration t3 within the third sequence interval SI3. For a given kth time duration tk, the linear increase in time duration is represented as:

$$tk = t1 + (k-1)\Delta \qquad [\text{EQ. 1}]$$

The equations for t2 and t3 are indicated in FIG. 2.

FIG. 3A illustrates an exemplary transmit signal 125 according to one or more embodiments. The primal sequence {s0, s1, s2} is used. As FIG. 3A indicates, the time duration between every sequential pair of chirp multiples increases linearly and is unrelated to the sequence interval.

Thus, the time duration t1 is used between s0*c and s1*c and the time duration t2, which is linearly increased from t1 according to EQ. 1, is used between s1*c and s2*c in sequence interval SI1. Similarly, the time duration t7 is used between s0*c and s1*c and the time duration t8, which is linearly increased from t7 according to EQ. 1, is used between s1*c and s2*c in sequence interval SI3.

FIG. 3B illustrates another exemplary transmit signal 125 according to one or more embodiments. The primal sequence {s0, s1, s2} is used again. As FIG. 3B indicates, the time duration between chirp multiples within each sequence interval SIi is the same for all sequence intervals SIi. The time duration between sequence intervals increases linearly. That is, the time duration t1 is used between s0*c and s1*c and between s1*c and s2*c regardless of the sequence interval. But, the time duration between sequence intervals SI1 and SI2 is t2, which is linearly increased from t1 according to EQ. 1, while the time duration between sequence intervals SI2 and SI3 is t3, which is linearly increased from t2 according to EQ. 1.

Exemplary symbol sequences include an orthogonal sequence, such as a Hadamard code sequence, and a pseudorandom sequence. Thus, the exemplary sequences of symbols {a0, a1, a2}, {b0, b1, b2}, and {c0, c1, c2} shown in FIG. 2 may be orthogonal symbols {1, 1, 1} {1, −1, 1}, and {1, −1, −1}, for example. Both the repetition of the sequence of symbols (i.e., repetition of the chirp multiples in each sequence interval SIi of a frame) and the linear increase in the time duration, according to any of the exemplary embodiments, provide benefits. The repetition of the symbol sequence results in simplified processing of the reflected signals and the linear increase facilitates control of both the frequency range and amplitude of sidelobes in the Doppler spectrum. Each of these aspects is further detailed.

Figure 4:
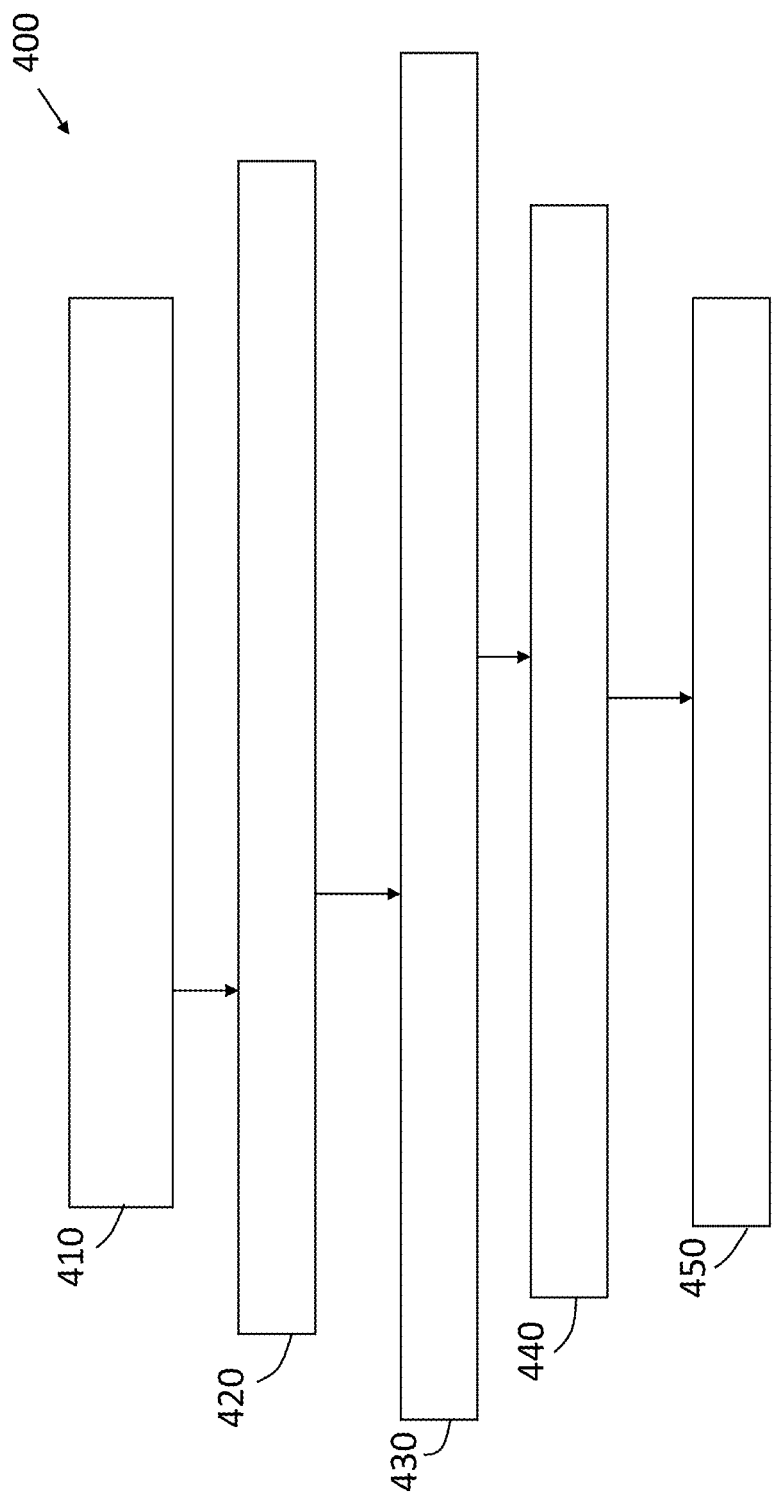
FIG. 4 is a process flow of a method of processing reflected energy that results from a transmission scheme for implementing CDMA in a radar system according to one or more embodiments.

FIG. 4 is a process flow of a method 400 of processing reflected energy 135 that results from a transmission scheme for implementing CDMA in a radar system 110 according to one or more embodiments. As previously noted, one or more receivers 130 may receive reflected energy 135 based on one or more objects 160. The received reflected energy 135 may be the sum of reflections of two or more transmitted signals 125. Thus, at the controller 115 of the radar system 110, at the controller 140 of the vehicle 100, or a combination of both, processing is implemented to separate the portions of the reflected energy 135 attributable to each transmit signal 125. This is necessary for accurate detection of the one or more objects 160 that resulted in the reflected energy 135. At block 410, the processes include receiving the reflected energy 135 as a vector x of length L, which is the number of received symbols. The vector x results from known pre-processing that includes down-converting and digitizing the reflected energy 135. The primal sequence length is M. Thus, M=3 in the examples discussed with reference to FIG. 2 and FIGS. 3A and 3B.

At block 420, the processes include separating the vector x of the reflected energy 135 into M sub-vectors $x_i$, with each sub-vector corresponding with the repeating instance of a chirp multiple associated with one of the symbols in the primal sequence. For example, when M=3, $x_1$ would include x(1:4:7:10, . . . ), which are all associated with the first symbol of the primal sequence, and $x_2$ would include x(2:5:8:11, . . . ), which are all associated with the second symbol of the primal sequence. Generally, $$x_i = x(i: i+M: i+2M: i+3M: \ldots ) \qquad [\text{EQ. 2}]$$

To be clear, the separation discussed with reference to EQ. 2 does not yet consider that different symbols are used in the primal sequence of each transmitter 120.

At block 430, the processes include generating a primal code matrix C of the primal code of each of the T transmitters 120. For explanatory purposes, the number of transmitters 120 T is assumed to be the same as the primal sequence length M. As previously noted, M may be greater than T.

$$C = \begin{bmatrix} c_1 \\ \ldots \\ c_M \end{bmatrix} \quad [\text{EQ. 3}]$$

In the exemplary case discussed with reference to FIG. 2, for example, M=T=3, and $c_1=\{a0, a1, a2\}$, $c_2=\{b0, b1, b2\}$, and $c_3=\{c0, c1, c2\}$. At block 440, the processes include obtaining a discrete Fourier transform (DFT) F from the reflected energy 135. The dimension of the DFT F is (N, L/M), where N is the number of Doppler frequency bins that are selected.

At block 450, obtaining a DFT output matrix Y includes obtaining:

$$Y = \begin{bmatrix} y_1 \\ \ldots \\ y_M \end{bmatrix} \quad [\text{EQ. 4}]$$

Each vector $y_i$ of the DFT output matrix Y is given by:

$$y_i = Fx_i \quad [\text{EQ. 5}]$$

Then, at block 460, decoding the symbols (i.e., separating the reflections resulting from each of the T different transmitters 120) results in decoded matrix Z, which has a dimension of T, which is assumed to be the same as the number of symbols M, by N, the number of Doppler frequency bins. The decoded matrix Z is given by:

$$Z = CY \quad [\text{EQ. 6}]$$

As previously noted, because of the repetition of the primal sequence, the complexity of the decoding at the receivers 130 is reduced and, thus, the computation efficiency is increased. As illustrated by EQ. 2, every Mth element of the vector x of the reflected energy 135 may be processed together. That is, decoding a conventional code requires a DFT of size L per each transmit antenna code sequence (i.e. M DFTs of length L). According to one or more embodiments, there are M DFTs of size L/M. Thus, the decoding complexity is reduced by a factor of M when compared with a conventional, non-repeating code Once the decoded matrix Z is obtained, known additional processes, such as beamforming, may be performed to identify one or more objects 160 and to obtain information (i.e., range, range rate, DOA) about each of the objects 160.

Figure 5:
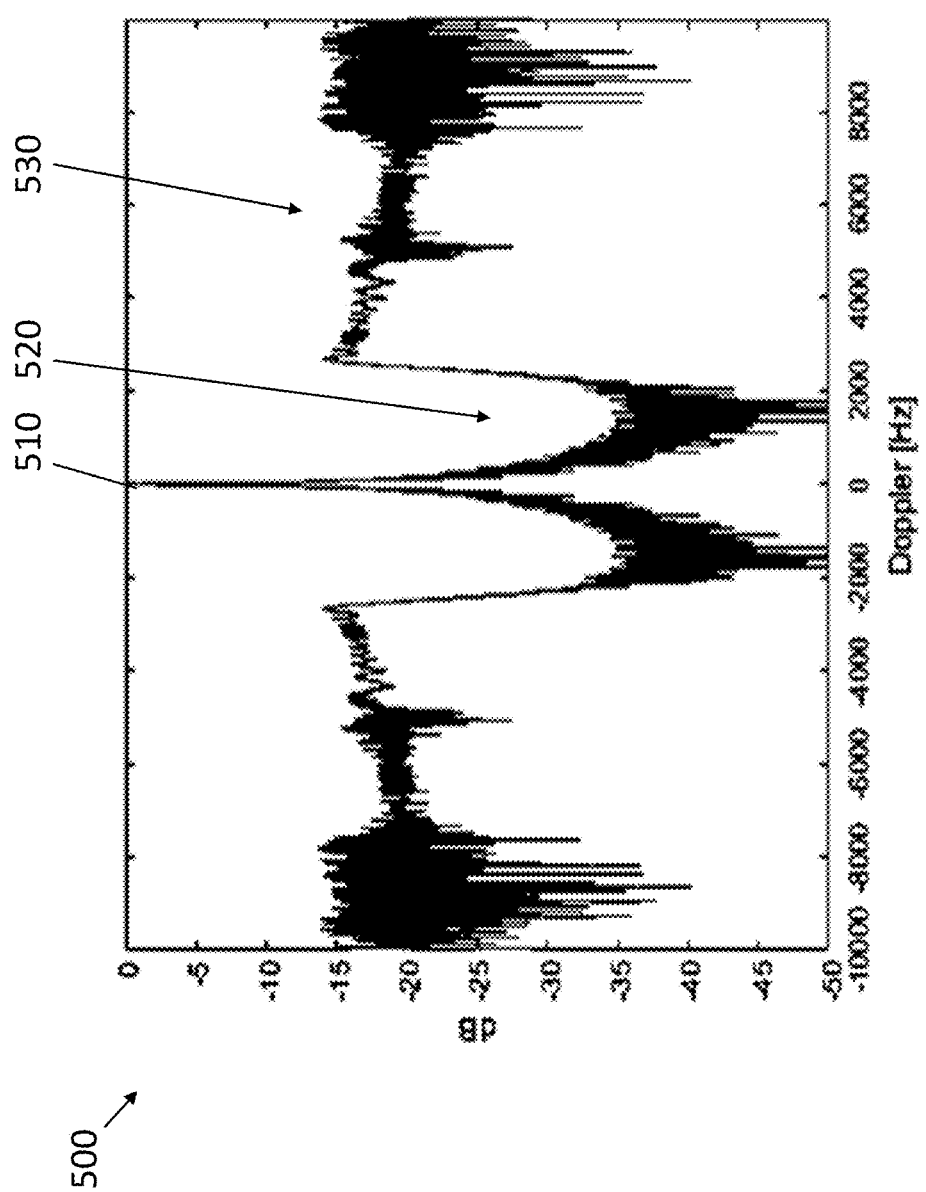
FIG. 5 illustrates a decoded output resulting from the processing at each receiver that is discussed with reference to FIG. 4.

FIG. 5 illustrates an exemplary decoded output 500 (i.e., an element of the decoded matrix Z) resulting from the processing at each receiver 130 that is discussed with reference to FIG. 4. The Doppler frequency in hertz (Hz) is shown along one axis, and the amplitude in decibels (dB) is shown along another, perpendicular, axis. The amplitude 510 at the Doppler frequency (i.e., 0 Hz) corresponding with an object 160 is much higher than the amplitude level 520 of adjacent sidelobes, which are immediately adjacent to the Doppler frequency of the detected object 160. The amplitude level 530 of sidelobes that are at Doppler frequencies that are farther away from the Doppler frequency of the detected object 160 (referred to as farther sidelobes for explanatory purposes) are higher than the amplitude level 520 of adjacent sidelobes.

That is, the total energy in the sidelobes is the same as it would be using a prior transmission scheme. However, due to the repetition of the short primal code and the linear increase in duration(s) in the transmission scheme according to one or more embodiments, the distribution of the sidelobes is such that the adjacent sidelobes (i.e., side lobes that are closest to the main lobe) are much more attenuated (i.e., amplitude level 520 is lower) than farther sidelobes (i.e., sidelobes that are farther from the main lobe than the adjacent sidelobes). This facilitates high detection probability in the case of multiple objects 160. As further detailed, the maximum idle time ta between transmissions (i.e., maximum value of time duration tk according to EQ. 1) may be selected based on the desired attenuation in adjacent sidelobes and the desired width of the farther sidelobes. Determining this maximum idle time ta value facilitates determining the value of each time duration of the transmission scheme, according to the various embodiments, based on the linear relationship among the time durations (i.e., based on EQ. 1).

The sidelobe attenuation factor is determined as:

$$\frac{Ns}{M}\left(tc + \frac{ta}{2}\right)\left(\frac{1}{tc} - \frac{1}{tc+ta}\right) + 1 \quad [\text{EQ. 7}]$$

In EQ. 7, Ns is the number of symbols in a frame (e.g., 256 symbols), M is the number of symbols in the primal sequence (e.g., 3 symbols for 3 transmitters 120), and tc is the chirp duration (e.g., 50 microseconds per chirp). The maximum idle time ta is the maximum time delay value before the next transmission 120. Thus, for a desired adjacent sidelobe attenuation value (i.e., to achieve a given amplitude level 520 relative to the amplitude of the object 160), the maximum idle time ta and, consequently, the time duration values for a given transmission scheme may be determined. However, if the sidelobe attenuation value is too low for adjacent sidelobes, then the spread of the sidelobe energy will be too wide. That is, the adjacent sidelobe attenuation value achieved by the maximum idle time ta must be balanced with the width of the farther sidelobes. The wider the farther sidelobes, the closer they will be to the Doppler frequency of the object 160 (i.e., the adjacent sidelobes will become narrower), thereby increasing a chance of obscuring the object 160 from detection. The width of the farther sidelobes is given by:

$$\frac{1}{Mtc} - \frac{1}{M(tc+ta)} + \frac{1}{M\left(tc + \frac{ta}{2}\right)} \quad [\text{EQ. 8}]$$

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
a plurality of transmitters of a code division multiple access (CDMA) radar system configured to simultaneously transmit a frame of transmit signals, wherein a first time duration between transmissions of a first pair of sequential ones of the transmit signals is linearly increased to a second time duration between transmissions of a second pair of sequential ones of the transmit signals;
a receiver of the CDMA radar system configured to receive reflected energy resulting from reflection of one of more of the transmit signals of one or more of the plurality of transmitters by an object; and
a controller configured to process the reflected energy to obtain information about the object and to control an operation of the vehicle based on the information.

2. The vehicle according to claim 1, wherein the frame of the transmit signals transmitted by each of the plurality of transmitters is based on a same chirp, which is a frequency modulated continuous wave (FMCW) signal.

3. The vehicle according to claim 2, wherein the frame of the transmit signals transmitted by each of the plurality of transmitters includes M transmit signals repeated over sequence intervals that make up the frame, and M is greater than or equal to a number of the plurality of transmitters.

4. The vehicle according to claim 3, wherein the M transmit signals for each of the plurality of transmitters result from multiplying the chirp with M symbols, and the M symbols are different for each of the plurality of transmitters.

5. The vehicle according to claim 4, wherein the M symbols are a Hadamard code sequence or a pseudorandom sequence.

6. The vehicle according to claim 3, wherein the first pair of sequential ones of the transmit signals is a last transmit signal of a first sequence interval among the sequence intervals that make up the frame and a first transmit signal of a second sequence interval among the sequence intervals, and the second pair of sequential ones of the transmit signals is a last transmit signal of the second sequence interval and a first transmit signal of a third sequence interval among the sequence intervals.

7. The vehicle according to claim 6, wherein a time duration between transmission of sequential ones of the transmit signals within a same sequence interval among the sequence intervals is a constant time duration for all the sequence intervals.

8. The vehicle according to claim 3, wherein the first pair of sequential ones of the transmit signals and the second pair of sequential ones of the transmit signals are within a same sequence interval among the sequence intervals that make up the frame.

9. The vehicle according to claim 3, wherein processing the reflected energy includes obtaining a vector of elements from the reflected energy and decoding every M elements of the vector together based on a repetition of the M transmit signals for each of the sequence intervals.

10. The vehicle according to claim 1, further comprising one or more additional receivers of the CDMA radar system.

11. A method of configuring a radar system in a vehicle, the method comprising:
arranging a plurality of transmitters of a code division multiple access (CDMA) radar system to simultaneously transmit a frame of transmit signals, wherein a first time duration between transmissions of a first pair of sequential ones of the transmit signals is linearly increased to a second time duration between transmissions of a second pair of sequential ones of the transmit signals;
arranging a receiver of the CDMA radar system to receive reflected energy resulting from reflection of one of more of the transmit signals of one or more of the plurality of transmitters by an object; and
configuring a controller to process the reflected energy to obtain information about the object and to control an operation of the vehicle based on the information.

12. The method according to claim 11, further comprising basing the frame of the transmit signals transmitted by each of the plurality of transmitters on a same chirp, which is a frequency modulated continuous wave (FMCW) signal.

13. The method according to claim 12, further comprising including, in the frame of the transmit signals transmitted by each of the plurality of transmitters, M transmit signals repeated over sequence intervals that make up the frame, wherein M is greater than or equal to a number of the plurality of transmitters.

14. The method according to claim 13, further comprising obtaining the M transmit signals for each of the plurality of transmitters by multiplying the chirp with M symbols, wherein the M symbols are different for each of the plurality of transmitters.

15. The method according to claim 14, further comprising selecting the M symbols to be a Hadamard code sequence or a pseudorandom sequence.

16. The method according to claim 13, wherein the first pair of sequential ones of the transmit signals is a last transmit signal of a first sequence interval among the sequence intervals that make up the frame and a first transmit signal of a second sequence interval among the sequence intervals, and the second pair of sequential ones of the transmit signals is a last transmit signal of the second sequence interval and a first transmit signal of a third sequence interval among the sequence intervals.

17. The method according to claim 16, further comprising configuring a time duration between transmission of sequential ones of the transmit signals within a same sequence interval among the sequence intervals as a constant time duration for all the sequence intervals.

18. The method according to claim 13, further comprising configuring the first pair of sequential ones of the transmit signals and the second pair of sequential ones of the transmit signals to be within a same sequence interval among the sequence intervals that make up the frame.

19. The method according to claim 13, wherein processing the reflected energy includes obtaining a vector of elements from the reflected energy and decoding every M elements of the vector together based on a repetition of the M transmit signals for each of the sequence intervals.

20. The method according to claim 11, further comprising arranging an additional one or more receivers of the CDMA radar system.

* * * * *